United States Patent [19]

Smith

[11] Patent Number: 4,887,740

[45] Date of Patent: Dec. 19, 1989

[54] VALVE FOR BEVERAGE DISPENSER AND THE LIKE

[75] Inventor: Dell W. Smith, Los Angeles, Calif.

[73] Assignee: Bar-Master International, Los Angeles, Calif.

[21] Appl. No.: 201,938

[22] Filed: Jun. 3, 1988

[51] Int. Cl.⁴ .......................... B67D 5/56; F16K 41/00
[52] U.S. Cl. ............................. 222/129.1; 222/144.5; 137/625.17; 251/363
[58] Field of Search .......................... 222/129.1-129.4, 222/144.5, 182; 137/637.4, 625.17, 625.77; 251/304, 316, 363

[56] References Cited

U.S. PATENT DOCUMENTS

| | | | |
|---|---|---|---|
| 3,245,430 | 4/1966 | Enterante | 137/637.4 |
| 3,354,911 | 11/1967 | Fall | 251/363 |
| 3,451,430 | 6/1969 | Cowdin | 251/363 |
| 3,863,810 | 2/1975 | Hanson | 222/129.1 |
| 4,162,028 | 7/1979 | Reichenberger | 222/129.4 |
| 4,441,524 | 4/1984 | Mese | 251/316 |
| 4,619,378 | 10/1986 | de Man | 222/129.2 |
| 4,667,928 | 5/1987 | Davatz et al. | 251/316 |
| 4,765,513 | 8/1988 | McMillin et al. | 222/129.1 |

Primary Examiner—Joseph J. Rolla
Assistant Examiner—Steve Reiss
Attorney, Agent, or Firm—Harris, Kern, Wallen & Tinsley

[57] ABSTRACT

A valve for control of fluid flow, the valve including a housing having a valve bore with inlet and outlet ports, a seal cartridge slidingly inserted into the bore and having integrally formed seal rings, in sealing engagement with the bore, and a valve spindle carried in the seal cartridge in sealing engagement with the seal rings with the spindle moveable between valve closed and open positions. A valve having two inlet ports and an outlet port with the seal cartridge being selectively positionable in the housing for controlling flow from a selected one of the inlet ports to the outlet port.

25 Claims, 3 Drawing Sheets

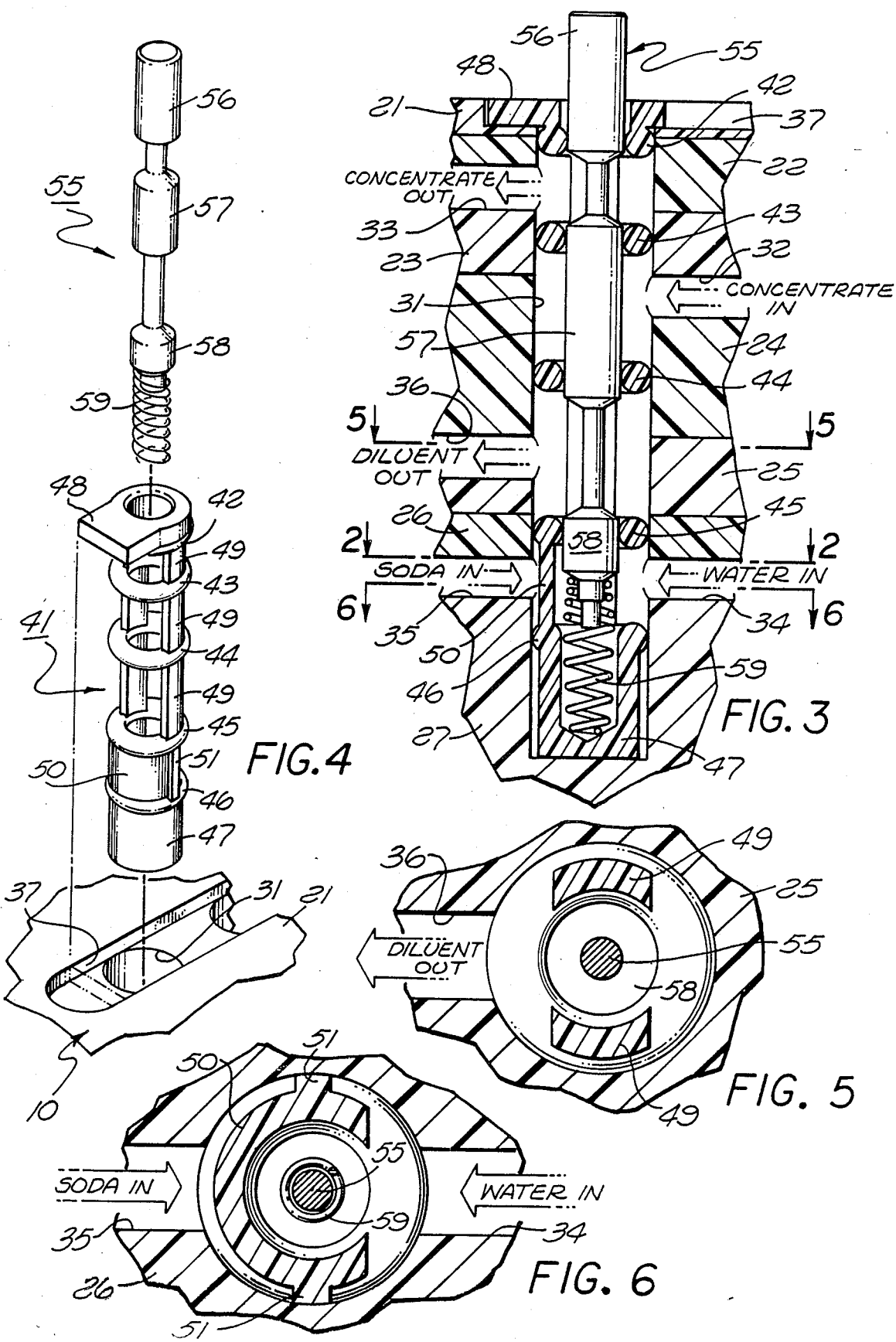

VALVE FOR BEVERAGE DISPENSER AND THE LIKE

BACKGROUND OF THE INVENTION

This invention relates to valves for the control of fluid flow, and in particular, to a new and improved valve especially suited for post-mix dispensing of beverages where a concentrate is mixed with a diluent, typically a syrup with water or soda. A typical post-mix valve of this type is shown in U.S. Pat. No. 3,863,810.

In post-mix dispensing, a "finished" beverage is produced by the mixing of a concentrate and a diluent at the time and point of dispensing. Typically, concentrate and diluent are brought to a valve controlling two flow paths, which valve when activated provides for flow of both concentrate and diluent to a mixing nozzle, with these two streams coming together over the container into which the drink is being dispensed.

Today's post-mix dispensers, such as that shown in the aforementioned patent, provide one or two diluent sources and a plurality of concentrate sources. Carbonated water or soda is provided as a diluent for drink syrups such as Coca-Cola, 7-Up and root beer. Also, plain water may be provided as a diluent for juice concentrates for producing noncarbonated beverages. Both carbonated and non-carbonated drinks can be provided from a dispenser of the conventional type, with one or more of the valves being dedicated to a non-carbonated diluent source and one or more dedicated to a soda source. This arrangement requires a predetermined fixed configuration for the flow paths within the housing of the dispenser and requires specific configuration orders from the customer, more complicated inventories and production control, and often longer lead times in responding to orders.

One of the objects of the present invention is to provide a solution to this problem. More specifically, it is an object to provide a new and improved valve having two inlet ports for flow control to an outlet port, with the valve being readily changed to permit flow only from the first inlet port or only from the second inlet port.

Valves used for flow control, such as that shown in the aforementioned patent, incorporate a number of sealing elements between the valve spindle and housing to avoid leakage and cross-contamination between adjacent flow streams. Common forms for such sealing elements are O-rings, packings, and V-seals, which typically are positioned in counterbores, seats and ring-grooves. Providing the locations for the sealing elements often requires additional machining steps during manufacture and additional steps in positioning the sealing elements during assembly. Also, replacement of individual sealing elements in an assembled unit requires disassembly at the sealing element and/or special tooling for accessing the sealing element.

It is an object of the present invention to provide a solution to this troublesome problem and more specifically, it is an object to provide a valve with a removeable seal cartridge slidingly insertable into the valve bore, with the valve spindle carried in the seal cartridge. It is another object of the invention to provide such a seal cartridge which can be integrally molded or otherwise produced with a plurality of seal rings so that the cartridge with the rings can be inserted into and removed from a bore without requiring disassembly of the valve.

Other objects, advantages, features and results will more fully appear in the course of the following description.

SUMMARY OF THE INVENTION

A valve for control of fluid flow with a valve bore in a housing, a seal cartridge slidingly inserted into the bore and having integrally formed seal rings in sealing engagement with the bore, and a valve spindle carried in the seal cartridge for sealing engagement with the seal rings and moveable between a valve closed position and a valve open position for controlling flow of fluid between inlet and outlet ports of the housing. A seal cartridge formed as a unit with spaced seal rings for ready insertion into and removal from the valve bore as a single unit. A valve with a valve bore having two inlet ports and an outlet port, with the seal cartridge including an inlet port blocking member with the seal cartridge positionable in the bore to selectively locate the blocking member at each of the inlet ports.

BRIEF DESCRIPTION OF THE DRAWINGS

FIG. 3 is an enlarged partial sectional view taken along the line 3—3 of FIG. 1;

FIG. 4 is an exploded perspective view illustrating the assembly of the valve of FIG. 3;

FIG. 5 is an enlarged partial sectional view taken along the line 5—5 of FIG. 3;

FIG. 6 is an enlarged partial sectional view taken along the line 6—6 of FIG. 3;

DESCRIPTION OF THE PREFERRED EMBODIMENTS

Figure 1:
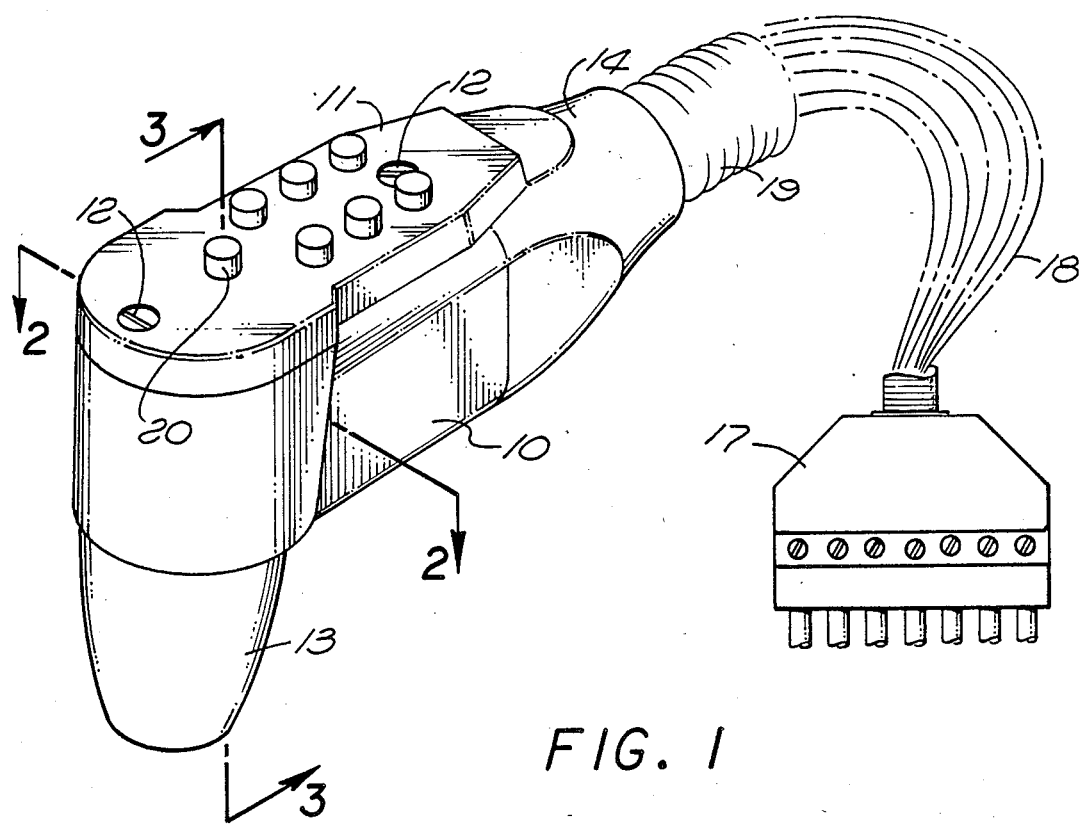
FIG. 1 is an overall view illustrating a beverage dispenser incorporating the presently preferred embodiment of the invention.

The dispenser as shown in FIG. 1 may be conventional in design and construction, with the exceptions to be discussed below. Dispensers of this type are presently on the market, and one such dispenser is shown in U.S. Pat. No. 3,863,810.

The dispenser includes a housing 10 with a top plate 11 attached by screws 12, a nozzle 13 which may be a push fit onto the housing, and a shroud 14 which may be held in place by the top plate 11. A plurality of fluid sources is connected to the housing by a connector 17 with fluid lines 18 in a flexible hose 19. The valves are positioned within the housing 10 and are operated by push buttons 20, with seven valves incorporated in the specific embodiment illustrated. With this particular unit, five concentrate lines and two diluent lines are provided at the connector 17 and are controlled by seven of the push buttons 20. Of course, one of the valves of the invention may be used alone, and any number of the valves may be used in a dispenser.

In the preferred embodiment illustrated, the housing is a laminated structure of a plurality of plates 21-27 with the lateral or horizontal fluid flow paths formed in the plates by milling, and with the vertical flow paths including the valve bores, formed by drilling. This is a conventional method for production of such housings. In the conventional design, grooves and/or shoulders are provided in the various plates at the valve bores for receiving O-rings as seals. Also in the conventional design, each concentrate source is connected to a different valve bore, and one diluent source is connected to certain bores while the other diluent source is connected to other valve bores. Usually one bore is used for water only and one bore for soda only.

Figure 2:
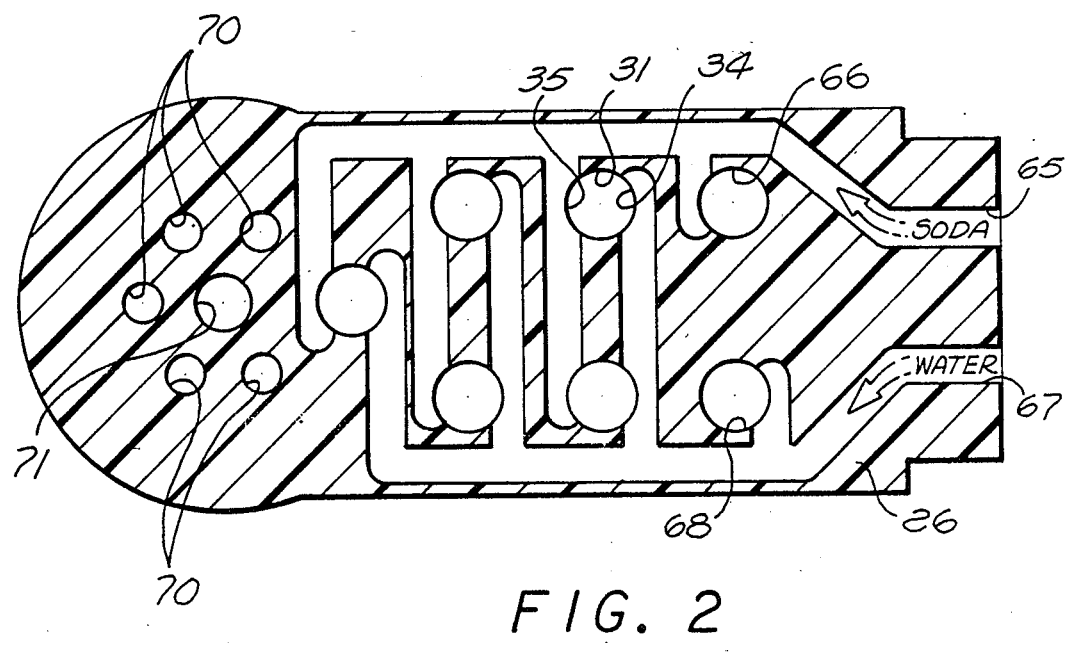
FIG. 2 is an enlarged sectional view taken along the line 2—2 of FIG. 1.

The valve of the present invention differs from the conventional design in two respects; a single valve seal cartridge is utilized for each valve rather than a plurality of separate sealing elements, and two diluent sources are connected to the same valve rather than having only a single diluent source per valve. Having two sources to a single valve provides for ease of switching from one diluent to the other. Flow paths for the diluents are shown in FIG. 2, and the valve construction is shown in FIGS. 3-6.

A cylindrical valve bore 31 is provided in the housing 10 through the plates 21-27. A concentrate flow path is provided by an inlet port 32 and an outlet port 33. A diluent flow path is provided by an inlet port 34 for water and another inlet port 35 for soda, and an outlet port 36. Preferably, an index slot 37 is provided in the plate 21 at the top of the housing adjacent the bore 31.

A seal cartridge 41 is positioned in the bore 31. The seal cartridge is formed as a single unit, typically an elastomer molding, and in the preferred embodiment illustrated, the bore 31 is cylindrical and the seal cartridge 41 slides into and is rotatable in the bore.

As best seen in FIG. 4, the seal cartridge has seal rings 42-46, a bottom 47, and preferably, an index tab 48 at the top. The seal rings 42-45 are joined by spacers 49. The seal rings 45, 46 are joined by a port blocking web 50 with seal ribs 51.

A valve spindle 55 is positioned in the seal cartridge 41. The valve spindle has lands 56, 57, 58, and in the preferred design, a spring 59 is positioned between the bottom 47 of the seal cartridge and the valve land 58 for urging the valve upward to the valve closed position as shown in FIG. 3.

The diluent flow paths in the housing are shown in FIG. 2. The soda line is connected at the path 65 and flows to inlet ports at a number of the bores, including the bore 31 and the bore 66. The water line is connected to the path 67 and flows to a number of bores including the bore 31 and the bore 68. With this arrangement, soda can be provided to any of the bores except 68 and water can be provided to any of the bores except 66. Typically there is no provision for a concentrate at the bores 66, 68.

The selection of soda or water for the bore 31 and other four bores served by both diluent lines is made by positioning the seal cartridge in the bore. As illustrated in FIG. 3, the seal cartridge is inserted with the port blocking web 50, seal rings 45, 46 and seal ribs 51 closing off the soda inlet port 35. This is best accomplished by positioning the index tab 48 in the slot 37 as illustrated. If it is desired to have water as the diluent for this valve, the seal cartridge is raised slightly to move the index tab out of the slot, the cartridge is rotated 180 degrees and pushed down to the operating position. Now the water inlet port 34 is sealed off and the soda inlet port 35 is open.

This repositioning of the seal cartridge does not affect the concentrate flow path. The concentrate inlet and outlet flow paths and the diluent outlet flow paths are conventional in design, with the fluids leaving the housing through the conventional flow paths. The five concentrate outlets from the housing to the nozzle are seen in FIG. 2 at 70, and the diluent outlet at 71.

In operation, a specific beverage is dispensed by pushing the appropriate button 20, thereby moving the corresponding valve spindle 55 downward and compressing the spring 59. When in the normal or valve closed position, the seal ring 43 about the land 57 blocks fluid flow between the inlet port 32 and outlet port 33, and the seal ring 45 and land 58 block fluid flow between inlet port 34 and the outlet port 36, with the seal ring 44 and land 57 preventing mixing of the two fluids and the seal ring 42 preventing leakage outward. Moving the spindle downward and compressing the spring, moves the land 57 out of the seal ring 43 and provides a flow path between the inlet port 32 and the outlet port 33. Also, the land 58 is moved out of the seal ring 45 providing a flow path between the inlet port 34 and the outlet port 36. If the seal cartridge is rotated 180 degrees to the position opposite that shown in FIG. 3, then inlet port 34 is sealed off and the flow path is established between the inlet port 35 and the outlet port 36.

Figure 7:
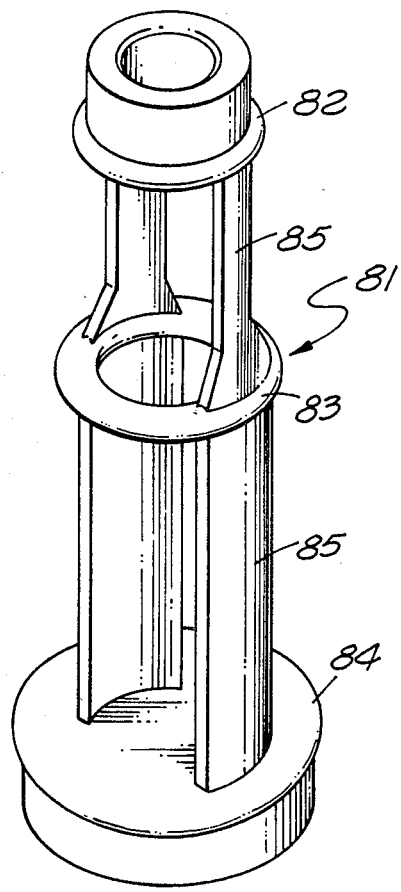
FIG. 7 is a perspective view of an alternative embodiment of seal cartridge.
Figure 8:
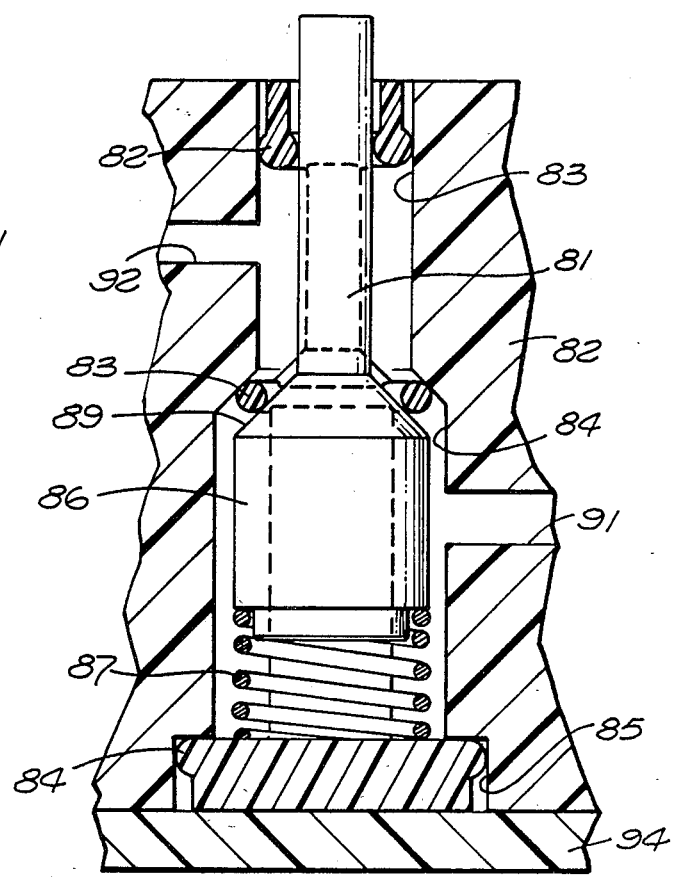
FIG. 8 is a sectional view through a valve incorporating the seal cartridge of FIG. 7.

An alternative embodiment of the valve is shown in FIGS. 7 and 8, with a seal cartridge 81 having seal rings 82, 83, 84 joined by spacers 85. The seal cartridge 81 is positioned in a bore in a housing 82, with the bore being a stepped configuration with cylindrical sections 83, 84, 85. A valve spindle 86 is inserted in the seal cartridge, with a spring 87 between the bottom of the spindle and the bottom of the seal cartridge. The spindle has a valve seat 89 which engages the seal ring 83 for closing a flow path between port 91 and port 92. The bore in the housing is closed at the upper end by the seal ring 82 and at the lower end by the seal ring 84 and bottom plate 94.

Figure 9:
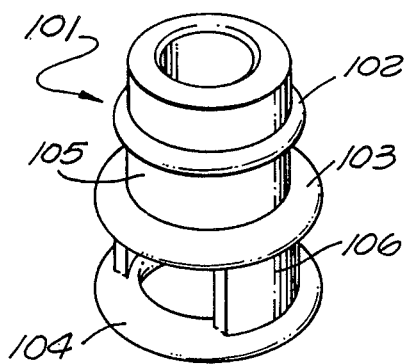
FIG. 9 is a perspective view of another alternative embodiment for the seal cartridge.
Figure 10:
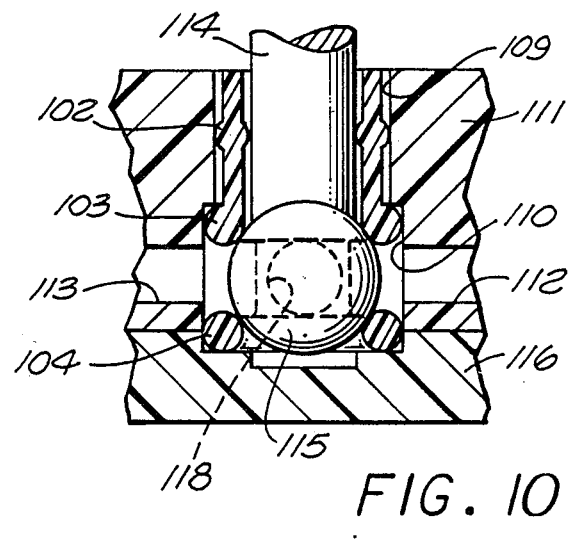
FIG. 10 is a sectional view through a valve incorporating the seal cartridge of FIG. 9.

Another alternative embodiment is shown in FIGS. 9 and 10, with a seal cartridge 101 having seal rings 102, 103, 104, with the seal rings 102, 103 joined by a sleeve 105 and with the seal rings 103, 104 joined by spacers 106.

The seal cartridge 101 is positioned in a two-step bore 109, 110 of a housing 111, with ports 112 and 113. A rotatable spindle 114 with a ball 115 is positioned in the seal cartridge and the bottom of the housing is closed by a plate 116. The valve is shown in the closed position in FIG. 10, and is moved to the open position by rotating the spindle 90 degrees to align the passage 118 in the ball with the ports 112, 113. In this embodiment, the seal ring 102 provides sealing against leakage, with the seal rings 103 and 104 providing the sealing at the ball, and with the seal ring 104 also sealing against leakage between the bottom plate and the housing.

Thus it is seen that the unitary seal cartridge with integral seal rings provides the desired valve sealing operation and also permits insertion and removal of seal rings as a unit, without requiring separate grooves and the like for retaining individual sealing elements. Also, the seal cartridge provides use with a valve having a pair of inlet ports for a single flow path to an outlet port and selection of one of the inlet ports. Of course, the reverse operation can also be used, with the flow in the opposite direction from a single inlet port to a selected one of two outlet ports. While the specification and claims refer to two inlet ports and a single outlet port in a flow path, it will be understood that the reverse operation with a single inlet port and two outlet ports is covered as a part of the invention.

Currently, non-carbonated beverages of juice variety have become more in demand. This demand has created new markets as well as modified traditional markets (corner bars, restaurants, sporting events) and varies widely with popular attitude and geographic location.

The ability to provide a carbonated/non-carbonated option on most dispensing equipment of the hydraulic type, shown in FIG. 1, has been limited. Customers must specify to their distributors who in turn specify to the manufacturer the configuration of carbonated and non-carbonated flavors that are intended to be served. For example: of 8 possible flavors, 5 are to be carbonated and 3 are not. This results in the manufacture of a specific dispenser that has carbonated water rounted to 5 of the flavor valves and non-carbonated water routed to 3 of the flavor valves. Once this is done, the configuration is permanent. There is no practical way to change the configuration to 4 carbonated flavors plus 4 non-carbonated flavors, for example.

This system produces complicated inventories and often requires long lead times to manufacture customer's specific configurations.

The convertible post-mix dispenser was developed to solve the problems of permanent configurations and specialty inventories. The unit provides both carbonated and non-carbonated water to each flavor valve. These two sources are oriented 180° apart from each other in the same plane of delivery. Refer to FIG. 2. A multiple element valve seal cartridge is used which, when installed in one orientation, allows the flow of one diluent while sealing out the other diluent. To switch to the other diluent, the cartridge simply is removed, turned 180°, and reinserted. An indexing tab provides indication of correct orientation.

It should be noted that changing from carbonated to non-carbonated flavors is usually done at the time of installation. However, reconfiguring and servicing the unit is now possible in the field without call for a factory configured head.

I claim:

1. In a valve for control of fluid flow, the combination of:
    a housing having a valve bore with inlet and outlet ports;
    a seal cartridge slidingly inserted into said bore, said seal cartridge having first and second integrally formed, spaced seal rings in sealing engagement with said bore; and
    a valve spindle carried in said seal cartridge in sealing engagement with said seal rings, with said spindle moveable between a valve closed position for blocking fluid flow and a valve open position for flow between said inlet and outlet ports;
    wherein said bore is a smooth cylindrical bore and said seal cartridge is an integral elastomer molded cartridge.

2. A valve as defined in claim 1 wherein said valve is a slide valve and including a spring positioned in said bore in engagement with said spindle urging said spindle to said valve closed position.

3. A valve as defined in claim 2 with said seal cartridge having said first, second and third integrally formed, spaced seal rings in sealing engagement with said bore, with said spindle sliding in said seal cartridge between said valve closed and open positions.

4. A valve as defined in claim 1 wherein said valve is a slide valve, said bore is a cylindrical bore with first inlet and outlet ports and second inlet and outlet ports, said seal cartridge has third and fourth seal rings, with said first, second, third and fourth seal rings in sealing engagement with said bore, and
    said spindle has a first land engaging said first seal ring, a second land engaging said third seal ring and engaging said second seal ring when in said valve closed position, and a third land engaging said fourth seal ring when in said valve closed position, and providing a first flow path through said valve between said first inlet and outlet ports and a second flow path through said valve between said second inlet and outlet ports when in said open position.

5. A valve as defined in claim 4 wherein said seal cartridge has a closed bottom with a fifth seal ring in sealing engagement with said bore, and including
    a spring carried in said seal cartridge at said bottom for urging said valve spindle to said closed position.

6. A valve as defined in claim 1 wherein said valve is a slide valve, said bore has first and second inlet ports and an outlet port, and
    said seal cartridge has inlet port blocking means in sealing engagement with said bore, with said seal cartridge positionable in said bore to selectively position said blocking means at said first inlet port and at said second inlet port so that only one inlet port is available during use of the valve.

7. A valve as defined in claim 6 wherein said housing has spaced index slots at said bore, and said seal cartridge has an index tab selectively positionable in said index slots for orienting said seal cartridge in said bore to position said inlet port blocking means at a selected one of said first and second inlet ports.

8. A valve as defined in claim 1 wherein said valve is a rotary valve with said spindle having a ball portion and a shaft portion,
    with said seal cartridge having a third seal ring integrally formed with said first and second seal rings in sealing engagement with said bore, and
    with said shaft portion in sealing engagement with one of said seal rings and said ball portion in sealing engagement with the other two of said seal rings, with said spindle rotating in said cartridge between said valve closed and open positions.

9. A valve as defined in claim 1
    wherein said valve is a slide valve, said bore is a cylindrical bore, and said seal cartridge has a third seal ring integrally formed with said first and second seal rings in sealing engagement with said bore, with said spindle sliding in said seal cartridge between said valve closed and open positions.

10. A seal cartridge for use in a valve for control of fluid flow, the valve including a housing having a valve bore with inlet and outlet ports, a seal cartridge slidingly inserted into said bore, and a valve spindle carried in said seal cartridge,
    said seal cartridge having first and second integrally formed, spaced seal rings in sealing engagement with said bore, with said valve spindle in sealing engagement with said seal rings and moveable between a valve closed position for blocking fluid flow and a valve open position for flow between said inlet and outlet ports;

wherein said valve is a slide valve, said bore is a cylindrical bore with first and second inlet ports and an outlet port, and said seal cartridge has first and second seal rings and inlet port blocking means for sealing engagement with said bore, with said seal cartridge being rotatable in said bore to selectively position said blocking means at said first inlet port and at said second inlet port; and wherein said inlet port blocking means of said seal cartridge includes another seal ring connected to one of said first and second seal rings by spaced seal ribs substantially parallel to the axis of said bore, and a web between said one seal ring, said ribs and said other seal ring.

11. A seal cartridge as defined in claim 10 wherein said valve is a slide valve, said bore is a cylindrical bore with first inlet and outlet ports and second inlet and outlet ports, and said spindle has first, second and third lands, with said seal cartridge having third and fourth seal rings in sealing engagement with said bore, with said second first seal ring engaging said spindle first land, said second seal ring engaging said spindle second land when in said valve closed position, said third seal ring engaging said spindle second land, and said fourth seal ring engaging said spindle third land when in said valve closed position, and providing a first flow path through said valve between said first inlet and outlet ports and a second flow path through said valve between said second inlet and outlet ports when in said open position.

12. A seal cartridge as defined in claim 11 wherein said seal cartridge has a closed bottom with a fifth seal ring in sealing engagement with said bore, for carrying a spring at said bottom for urging said valve spindle to said closed position.

13. A seal cartridge as defined in claim 10 wherein said valve is a slide valve with a spring positioned in said bore in engagement with said spindle urging said spindle to said valve closed position, with said seal cartridge having a third seal ring integrally formed with said first and second seal rings in sealing engagement with said bore, with said spindle sliding in said seal cartridge between said valve closed and open positions.

14. A seal cartridge as defined in claim 10 wherein said housing has spaced index slots at said bore, and said seal cartridge has an index tab for positioning in said index slots for orienting said seal cartridge in said bore to position said inlet port blocking means at a selected one of said first and second inlet ports.

15. A seal cartridge for use in a valve for control of fluid flow, the valve including a housing having a valve bore with inlet and outlet ports, a seal cartridge slidingly inserted into said bore, and a valve spindle carried in said seal cartridge, said seal cartridge having first and second integrally formed, spaced seal rings in sealing engagement with said bore, with said valve spindle in sealing engagement with said seal rings and moveable between a valve closed position for blocking fluid flow and a valve open position for flow between said inlet and outlet ports;

wherein said valve is a slide valve, said bore is a cylindrical bore with first inlet and outlet ports and second inlet and outlet ports and a third inlet port, with said seal cartridge having third and fourth seal rings and inlet port blocking means in sealing engagement with said bore, with said seal cartridge being rotatable in said bore to selectively position said blocking means at said second inlet port and at said third inlet port, and with said first seal ring engaging said spindle first land, said second seal ring engaging said spindle second land when in said valve closed position, said third seal ring engaging said spindle second land, and said fourth seal ring engaging said spindle third land when in said valve closed position, and providing a first flow path through said valve between said first inlet and outlet ports and a second flow path through said valve between one of said second and third inlet ports and said second outlet port when in said open position.

16. A seal cartridge as defined in claim 15 wherein said inlet port blocking means of said seal cartridge includes another seal ring connected to one of said first and second seal rings by spaced seal ribs substantially parallel to the axis of said bore, and a web between said one seal ring, said ribs and said other seal ring.

17. A seal cartridge as defined in claim 15 wherein said housing has spaced index slots at said bore, and said seal cartridge has an index tab for positioning in said index slots for orienting said seal cartridge in said bore to position said inlet port blocking means at a selected one of said second and third inlet ports.

18. In a mixed drink dispenser having a first diluent inlet, a second diluent inlet, and a plurality of additional inlets for concentrates, the combination of:

a housing having a plurality of valve bores with first inlet and outlet ports and second inlet and outlet ports and a third inlet port for each bore, said housing also having first means defining a first diluent flow path between said first diluent inlet and said second inlet ports of at least some of said bores and defining a second diluent flow path between said second diluent inlet and said third inlet ports of said some bores;

a plurality of seal cartridges, with a seal cartridge slidingly inserted into each of said some bores, each of said seal cartridges having first, second, third and fourth integrally formed, spaced seal rings and inlet port blocking means in sealing engagement with the corresponding bore, with each said seal cartridge rotatable in said corresponding bore to selectively position the blocking means at the second inlet port and at the third inlet port of the bore; and a plurality of valve spindles, with a valve spindle carried in each of said seal cartridges in sealing engagement with the seal rings thereof, with said spindle moveable between a valve closed position for blocking fluid flow and a valve open position for flow between the inlet and outlet ports of the bore, each said spindle having a first land engaging said first seal ring, a second land engaging said third seal ring and engaging said second seal ring when in said valve closed position, and a third land engaging said fourth seal ring when in said valve closed position, and providing a first flow path through said valve between said first inlet and outlet ports and a second flow path through said valve between one of said second and third inlet ports and said second outlet port when in said open position.

19. A dispenser as defined in claim 18 wherein said inlet port blocking means includes another seal ring connected to one of said first and second seal rings by spaced seal ribs substantially parallel to the axis of said bore, and a web between said one seal ring, said ribs and said other seal ring.

20. A valve as defined in claim 18 wherein said housing has spaced index slots at said bore, and said seal cartridge has an index tab selectively positionable in said index slots for orienting said seal cartridge in said bore to position said inlet port blocking means at a selected one of said second and third inlet ports.

21. In a valve for control of fluid flow, the combination of:
a housing having a valve bore with inlet and outlet ports;
a seal cartridge slidingly inserted into said bore, said seal cartridge having first and second integrally formed, spaced seal rings in sealing engagement with said bore; and
a valve spindle carried in said seal cartridge in sealing engagement with said seal rings, with said spindle moveable between a valve closed position for blocking fluid flow and a valve open position for flow between said inlet and outlet ports;
wherein said valve is a slide valve, said bore is a cylindrical bore with first inlet and outlet ports and second inlet and outlet ports and a third inlet port,
said seal cartridge has third and fourth seal rings and inlet port blocking means in sealing engagement with said bore, with said seal cartridge rotatable in said bore to selectively position said blocking means at said second inlet port and at said third inlet port, and
said spindle has a first land engaging said first seal ring, a second land engaging said third seal ring and engaging said second seal ring when in said valve closed position, and a third land engaging said fourth seal ring when in said valve closed position, and providing a first flow path through said valve between said first inlet and outlet ports and a second flow path through said valve between one of said second and third inlet ports and said second outlet port when in said open position.

22. A valve as defined in claim 21 wherein said second and third inlet ports open into a zone of said bore, and said inlet port blocking means includes another seal ring connected to one of said first and second seal rings by spaced seal ribs substantially parallel to the axis of said bore, and a web between said one seal ring, said ribs and said other seal ring.

23. A valve as defined in claim 21 wherein said housing has spaced index slots at said bore, and said seal cartridge has an index tab selectively positionable in said index slots for orienting said seal cartridge in said bore to position said inlet port blocking means at a selected one of said second and third inlet ports.

24. A seal cartridge for use in a valve for control of fluid flow, the valve including a housing having a valve bore with inlet and outlet ports, a seal cartridge slidingly inserted into said bore, and a valve spindle carried in said seal cartridge,
said seal cartridge being an integral elastomer molded cartridge and having first and second integrally formed, spaced seal rings joined by spacers with lateral flowpaths therebetween and in sealing engagement with said bore, with said valve spindle in sealing engagement with said seal rings and moveable between a valve closed position for blocking fluid flow and a valve open position for flow between said inlet and outlet ports.

25. In a valve for control of fluid flow, the combination of:
a housing having a valve bore with inlet and outlet ports;
a seal cartridge slidingly inserted into said bore, said seal cartridge having first and second integrally formed, spaced seal rings in sealing engagement with said bore; and
a valve spindle carried in said seal cartridge in sealing engagement with said seal rings, with said spindle moveable between a valve closed position for blocking fluid flow and a valve open position for flow between said inlet and outlet ports;
wherein said valve is a slide valve, said bore has first and second inlet ports and an outlet port, and
said seal cartridge has first and second seal rings and inlet port blocking means in sealing engagement with said bore, with said seal cartridge positionable in said bore to selectively position said blocking means at said first inlet port and at said second inlet port; and
wherein said inlet port blocking means includes another seal ring connected to one of said first and second seal rings by spaced seal ribs substantially parallel to the axis of said bore, and a web between said one seal ring, said ribs and said other seal ring.

* * * * *